United States Patent
Kim et al.

(10) Patent No.: US 11,491,837 B2
(45) Date of Patent: Nov. 8, 2022

(54) SUSPENSION ARM AND BALL JOINT

(71) Applicant: ILJIN CO., LTD., Gyeongju-si Gyeongsangbuk-do (KR)

(72) Inventors: Hyun Woo Kim, Gyeongju-si Gyeongsangbuk-do (KR); Soon Chan Kwon, Gyeongju-si Gyeongsangbuk-do (KR); Sung Kook Park, Gyeongju-si Gyeongsangbuk-do (KR); Min Kook Park, Gyeongju-si Gyeongsangbuk-do (KR); Hyo Sang Hwang, Gyeongju-si Gyeongsangbuk-do (KR); Seung Hyun Nam, Gyeongju-si Gyeongsangbuk-do (KR); Se Hwan Kim, Gyeongju-si Gyeongsangbuk-do (KR); Mu Chang Kang, Gyeongju-si Gyeongsangbuk-do (KR)

(73) Assignee: ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 17/133,696

(22) Filed: Dec. 24, 2020

(65) Prior Publication Data
US 2021/0114426 A1 Apr. 22, 2021

Related U.S. Application Data

(63) Continuation of application No. PCT/KR2019/007752, filed on Jun. 26, 2019.

(30) Foreign Application Priority Data

Jun. 26, 2018 (KR) ........................ 10-2018-0073541

(51) Int. Cl.
B60G 7/00 (2006.01)

(52) U.S. Cl.
CPC ............. *B60G 7/005* (2013.01); *B60G 7/001* (2013.01); *B60G 2204/416* (2013.01);
(Continued)

(58) Field of Classification Search
CPC .. B60G 7/005; B60G 7/001; B60G 2204/416; B60G 2206/124; B60G 2206/7101;
(Continued)

(56) References Cited

U.S. PATENT DOCUMENTS 7,938,417 B2    5/2011  Ersoy et al.
2011/0133422 A1*  6/2011  Jeong .................. F16C 11/0638
                                                      280/124.1
(Continued)

FOREIGN PATENT DOCUMENTS

KR    101573397 B1    12/2015
KR    101792107 B1    11/2017
(Continued)

OTHER PUBLICATIONS

International Search Report of PCT/KR2019/007752 dated Oct. 11, 2019.

*Primary Examiner* — Darlene P Condra
(74) *Attorney, Agent, or Firm* — Dinsmore & Shohl LLP; Yongsok Choi, Esq.

(57) ABSTRACT

A suspension arm includes a ball stud including a spherical ball; a bearing in which the ball is accommodated; a housing having an inner peripheral portion, an outer peripheral portion, and a lower end portion that connects a lower end of the inner peripheral portion and a lower end of the outer peripheral portion, and configured to accommodate the ball and the bearing in a state in which the ball and the bearing are spaced apart from the inner peripheral portion; an arm body coupled to a portion of the outer peripheral portion of the housing; and an insert molding part formed on an outer (Continued)

peripheral portion of the bearing, the inner peripheral portion of the housing, and the lower end portion of the housing to couple the bearing with the housing. A convex-concave portion is formed on the inner peripheral portion of the housing along a circumferential direction.

17 Claims, 11 Drawing Sheets

(52) U.S. Cl.
CPC .................. *B60G 2206/124* (2013.01); *B60G 2206/7101* (2013.01); *B60G 2206/7104* (2013.01); *B60G 2206/81* (2013.01)

(58) Field of Classification Search
CPC ........ B60G 2206/7104; B60G 2206/81; B60G 2206/16; B60G 2206/72; B60G 2206/81012; B60G 2204/418; B60G 2204/1432; B60G 2206/013; B60G 2206/82092; F16C 2326/05; F16C 2208/66; F16C 2220/04; F16C 2208/04; F16C 11/0685; F16C 11/0633; F16C 11/06

See application file for complete search history.

(56) References Cited

U.S. PATENT DOCUMENTS

| | | | |
|---|---|---|---|
| 2011/0133423 A1* | 6/2011 | Jeong | F16C 11/0671 280/124.1 |
| 2012/0141192 A1* | 6/2012 | Kwon | F16C 11/0657 403/135 |
| 2014/0131970 A1* | 5/2014 | Kuroda | F16C 11/0685 280/124.107 |
| 2018/0154719 A1* | 6/2018 | Kwon | B29C 45/14 |
| 2019/0390705 A1* | 12/2019 | Nachbar | F16C 33/201 |
| 2020/0114716 A1* | 4/2020 | Ungruh | B60G 7/001 |

FOREIGN PATENT DOCUMENTS

| | | |
|---|---|---|
| KR | 101815146 B1 | 3/2018 |
| WO | 2017198402 A1 | 11/2017 |

* cited by examiner

SUSPENSION ARM AND BALL JOINT

CROSS REFERENCE TO RELATED APPLICATIONS

This application is a continuation of International Application No. PCT/KR2019/007752 filed on Jun. 26, 2019, which claims priority to Korean Patent Application No. 10-2018-0073541 filed on Jun. 26, 2018, the entire contents of which are herein incorporated by reference.

TECHNICAL FIELD

The present disclosure relates to a suspension arm and a ball joint.

BACKGROUND ART

A vehicular suspension device is a device for connecting a vehicle body and a wheel. The suspension device comprises a spring for absorbing vibration or impact transferred from a road surface to the vehicle body, a shock absorber for controlling the operation of the spring, and a suspension arm or a suspension link for controlling the operation of the wheel.

The suspension device is classified into a swing arm type, a wishbone type, and a MacPherson strut type according to a manner of controlling the operation of the wheel. The wishbone type of suspension device has a suspension arm for connecting a knuckle coupled to the wheel and the vehicle body. That is, one end of the suspension arm is connected to a cross member or a sub-frame which constitutes the vehicle body, and the other end of the suspension arm is connected to the knuckle through a ball joint. The suspension arm supports the wheel on the vehicle body and appropriately controls a toe-in of the wheel according to a driving condition of the vehicle, thereby improving straight drivability and steering stability of the vehicle.

SUMMARY

Technical Problem

The present disclosure provides a suspension arm and a ball joint which are capable of enhancing a coupling force between a housing of a ball joint and an insert molding part.

Technical Solution

Embodiments according to one aspect of the present disclosure relate to a suspension arm. The suspension arm according to an exemplary embodiment comprises: a ball stud including a spherical ball; a bearing in which the ball is accommodated; a housing having an inner peripheral portion, an outer peripheral portion, and a lower end portion that connects a lower end of the inner peripheral portion and a lower end of the outer peripheral portion, and configured to accommodate the ball and the bearing in a state in which the ball and the bearing are spaced apart from the inner peripheral portion; an arm body coupled to a portion of the outer peripheral portion of the housing; and a first insert molding part formed on an outer peripheral portion of the bearing, the inner peripheral portion of the housing, and the lower end portion of the housing to couple the bearing with the housing. A convex-concave portion is formed on the inner peripheral portion of the housing along a circumferential direction, and a first groove is formed on a lower side of the convex-concave portion along the circumferential direction. A second groove is formed on the lower end portion of the housing along the circumferential direction. The first groove and the second groove are filled with first insert molding part.

In one embodiment, the first groove and the second groove may be disposed to be spaced apart from each other.

In one embodiment, a corner portion may be formed at an edge portion where the inner peripheral portion of the housing and the lower end portion of the housing meet to be surrounded by the first groove and the second groove.

In one embodiment, the first groove may have a depth of 1 mm to 3 mm in a radially outward direction from the inner peripheral portion and a width of 1 mm to 3 mm in an axial direction.

In one embodiment, the second groove may have a depth of 1 mm to 3 mm upward from the lower end portion and a width of 1 mm to 3 mm in a radial direction.

In one embodiment, the suspension arm may further comprise a second insert molding part formed on a portion of the arm body and the outer peripheral portion of the housing to couple the housing with the arm body.

In one embodiment, a third groove may be formed on the outer peripheral portion of the housing above the arm body along the circumferential direction, and the third groove may be filled with the second insert molding part.

In one embodiment, the third groove may have a depth of 1 mm to 3 mm in the radially inward direction from the outer peripheral portion of the housing and a width of 1 mm to 3 mm in the axial direction.

In one embodiment, the first insert molding part and the second insert molding part may be made of a same plastic material.

In one embodiment, the first insert molding part and the second insert molding part may be made of a mixed material of a polyamide and a glass fiber.

In one embodiment, the arm body may comprise a fitting portion in which the outer peripheral portion of the housing is press-fitted.

In one embodiment, the arm body may be coupled to the housing by a welding in a state in which the outer peripheral portion of the housing is press-fitted in the fitting portion.

In one embodiment, the arm body may be coupled to the housing by the welding in a state in which the outer peripheral portion of the housing is brought into contact with an inner peripheral surface of the fitting portion.

In one embodiment, the suspension arm may further comprise a second insert molding part formed on the outer peripheral portion of the housing and the fitting portion of the arm body to couple the housing with the arm body.

Embodiments according to another aspect of the present disclosure relate to a ball joint. The ball joint according to various embodiments comprise: a ball stud including a spherical ball; a bearing in which the ball is accommodated; a housing having an inner peripheral portion, an outer peripheral portion, and a lower end portion that connects a lower end of the inner peripheral portion and a lower end of the outer peripheral portion, and configured to accommodate the ball and the bearing in a state in which the ball and the bearing are spaced apart from the inner peripheral portion; and an insert molding part formed on an outer peripheral portion of the bearing, the inner peripheral portion of the housing, and the lower end portion of the housing to couple the bearing with the housing. A convex-concave portion is formed on the inner peripheral portion of the housing along a circumferential direction, and a first groove is formed on a lower side of the housing along the circumferential direction. A second groove is formed on the lower end portion of the housing along the circumferential direction. The first groove and the second groove are filled with the insert molding part.

In one embodiment, the first groove and the second groove may be disposed to be spaced apart from each other.

In one embodiment, a corner portion may be formed at an edge portion where the inner peripheral portion of the housing and the lower end portion of the housing meet so as to be surrounded by the first groove and the second groove.

In one embodiment, the first groove may have a depth of 1 mm to 3 mm in a radially outward direction from the inner peripheral portion and a width of 1 mm to 3 mm in an axial direction.

In one embodiment, the second groove may have a depth of 1 mm to 3 mm upward from the lower end portion and a width of 1 mm to 3 mm in a radial direction.

Advantageous Effects

According to the suspension arm and the ball joint of one embodiment, since the first groove is formed on the inner peripheral portion of the housing of the ball joint, the second groove is formed in the lower end portion of the housing, and the first groove and the second groove are filled with the insert molding part, the coupling force between the housing of the ball joint and the insert molding part can be increased as the insert molding part cures and shrinks. Therefore, it is possible to prevent foreign substances such as water or dust from flowing between the housing of the ball joint and the insert molding part. In addition, since the coupling force between the housing of the ball joint and the insert molding part is increased, the amount of deformation of the insert molding part in the axial direction and the amount of displacement of the ball stud in the axial direction can satisfy a predetermined performance condition. As a result, the durability of the suspension arm can be enhanced.

DESCRIPTION OF REFERENCE NUMERALS

Figure 1:
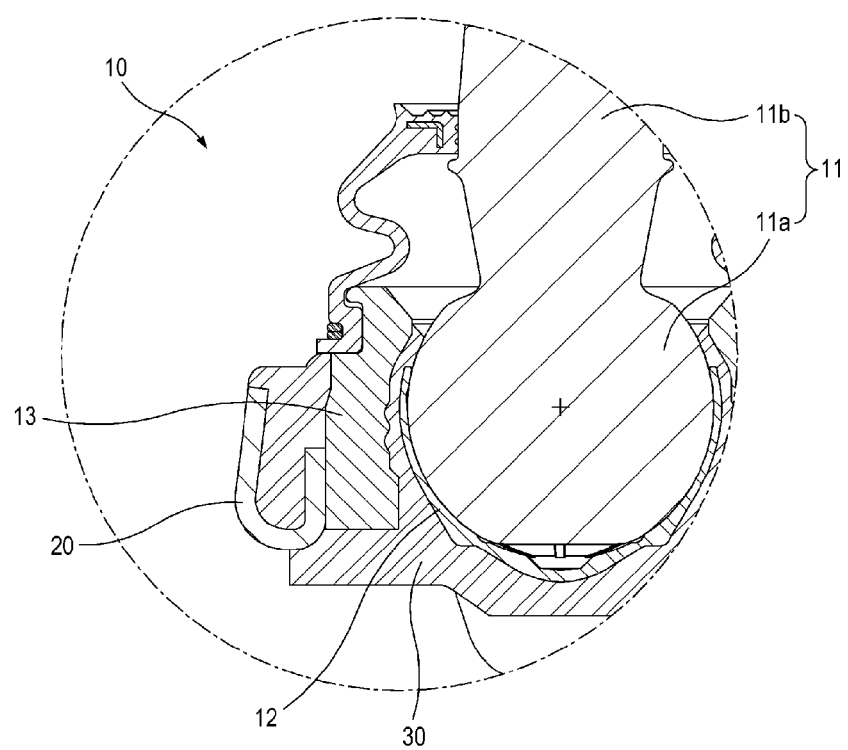
FIG. 1 is a partial cross-sectional view showing a conventional ball joint.

1: suspension arm,
100: ball joint,
110: ball stud,
111: ball,
112: rod,
120: bearing,
120a: inner peripheral surface,
120b: outer peripheral surface,
121: first guide rib,
122: second guide rib,
123: first groove,
124: second groove,
130: housing,
131: inner peripheral portion,
131a: first inner peripheral portion,
131b: second inner peripheral portion,
132: outer peripheral portion,
133: lower end portion,
134: convex-concave portion,
135: first groove,
135a: lower end surface,
136: second groove,
136a: inner wall surface,
137: third groove,
138: corner portion,
139: first welding portion,
140: arm body,
141: fitting portion,
141a: inner peripheral surface,
141b: outer peripheral surface,
142: sidewall portion,
142a: inner wall,
142b: outer wall,
143: second welding portion,
150: first insert molding part,
160: second insert molding part,
170: dust cover

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, the terms "comprising", "including", "having" and the like used herein should be construed as open-ended terms encompassing the possibility of including other embodiments.

The singular form described herein may include the plural form unless the context clearly dictates otherwise, and this is equally applied to the singular form set forth in the claims.

Throughout the present disclosure, when a component is referred to as being "connected" or "coupled" to another component, the component may be directly connected or coupled to another component, or may be connected or coupled to another component by intervening yet another component therebetween.

A directional directive of an "axial direction AD" used herein means a direction along a central line of a rod of a ball stud in the accompanying drawings. Directional directives of "upward", "above" and the like used herein are described on the basis of a direction in which the rod of the ball stud is positioned relative to a ball along the axial direction, directional directives of "downward", "below" and the like mean the direction opposite the above "upward", "above" and the like. In addition, a directional directive of a "radially outward direction OR" used herein means a direction vertically away from the central line of the ball stud, and a directional directive of a "radially inward direction IR" means a direction opposite the radially outward direction. Further, a directional directive of a "circumferential direction CD" used herein means a direction in which a component rotates while keeping a constant radius from the central line of the ball stud. The rod and the ball shown in the accompanying drawings may be arranged in directions different from the above directions, and the directional indicatives may be understood based thereon.

FIG. 1 is a partial cross-sectional view showing a conventional ball joint.

Referring to FIG. 1, a conventional ball joint 10 comprises a ball stud 11 having a ball 11a and a rod 11b; a bearing 12 in which the ball 11a is accommodated; and a housing 13 in which the ball 11a and the bearing 12 are accommodated. An insert molding part 30 is formed to couple the bearing 12 with the housing 13. The insert molding part 30 also serves to couple the ball joint 10 with the suspension arm 20 in a state in which the ball joint 10 is mounted to the suspension arm 20.

In such a conventional suspension arm, when the insert molding part 30 cures and shrinks, a gap may be formed between the housing 13 and the insert molding part 30. If foreign substances such as water or dust are introduced into the gap, the coupling force between the housing 13 and the insert molding part 30 may be weakened. In addition, when a strong force is applied in a direction in which the ball stud 11b is separated from the bearing 12, the amount of deformation of the insert molding part 30 in the axial direction and the amount of displacement of the ball stud 11b in the axial direction may be greater than a predetermined performance condition due to the gap between the housing 13 and the insert molding part 30. Accordingly, when such a phenomenon occurs, the durability of the suspension arm 20 may be deteriorated.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment.

Figure 2:
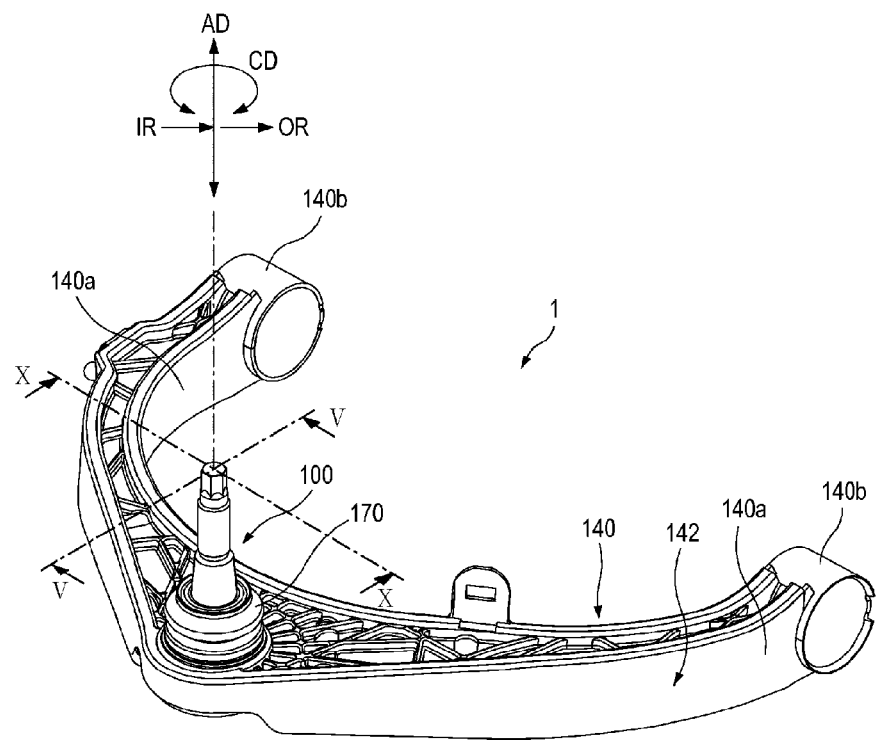
FIG. 2 is a perspective view showing a suspension arm according to one embodiment of the present disclosure.

FIG. 2 is a perspective view showing a suspension arm according to one embodiment of the present disclosure.

As shown in FIG. 2, a suspension arm 1 according to one embodiment of the present disclosure may be used as an upper control arm of the wishbone-type suspension device. Also, although not shown in the drawings of the present disclosure, the suspension arm 1 may be used as a lower control arm similarly to the upper control arm. The suspension arm 1 according to one embodiment may be formed of two or more types of materials as a composite suspension arm. The composite suspension arm may be defined as a hybrid suspension arm which has a reduced weight compared to a suspension arm made of a metal material and stiffness equal to or similar to that of the suspension arm made of a metal material. For example, the suspension arm 1 means a suspension arm in which an insert molding part (a second insert molding part 160) made of a plastic material is formed on an arm body 140 made of a steel material in order to reduce the weight of the vehicle. In addition, in the suspension arm 1, a reinforcing part (not shown) made of a steel material is further provided in the arm body 140 in order to improve the mechanical strength of the suspension arm 1. Accordingly, the strength of the suspension arm 1 may be enhanced and the coupling property between the arm body 140 and the insert molding part (the second molding part 160) may be enhanced.

Figure 3:
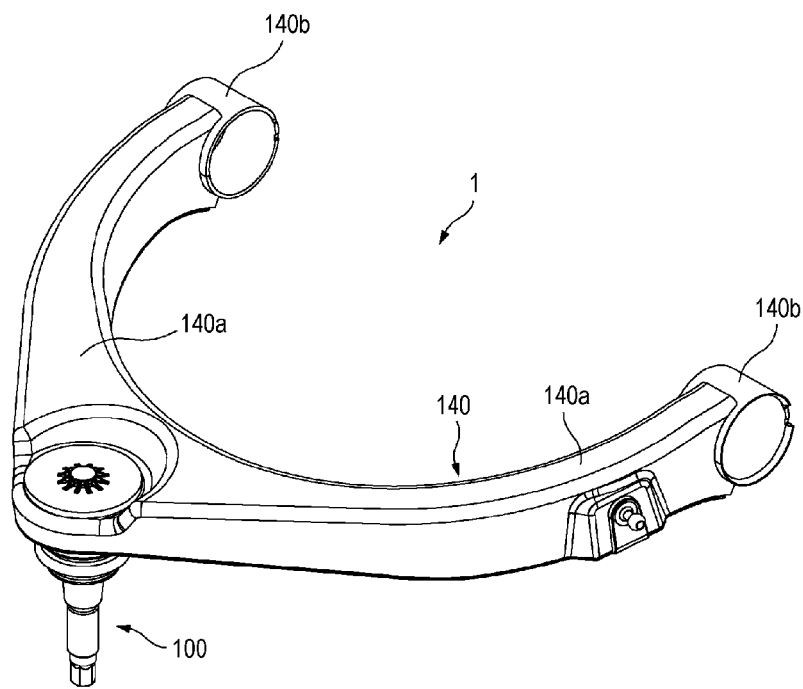
FIG. 3 is a perspective view showing the suspension arm shown in FIG. 2 when viewed in another direction.

FIG. 3 is a perspective view showing the suspension arm shown in FIG. 2 when viewed in another direction.

As shown in FIG. 3, the suspension arm 1 according to one embodiment of the present disclosure comprises a ball joint 100 and the arm body 140. The arm body 140 may form the skeleton of the suspension arm 1, and may be manufactured by press-forming a metallic plate material (for example, a high-tension steel plate). When the suspension arm 1 is used as the upper control arm, the arm body 140 may have a Y-like planar shape. In this case, the arm body 140 may comprise two leg parts 140a. The arm body 140 may also comprise two bushing pipes 140b disposed at ends of the leg parts 140a. When the suspension arm 1 is used as the lower control arm, the arm body may have an L-like planar shape.

Figure 4:
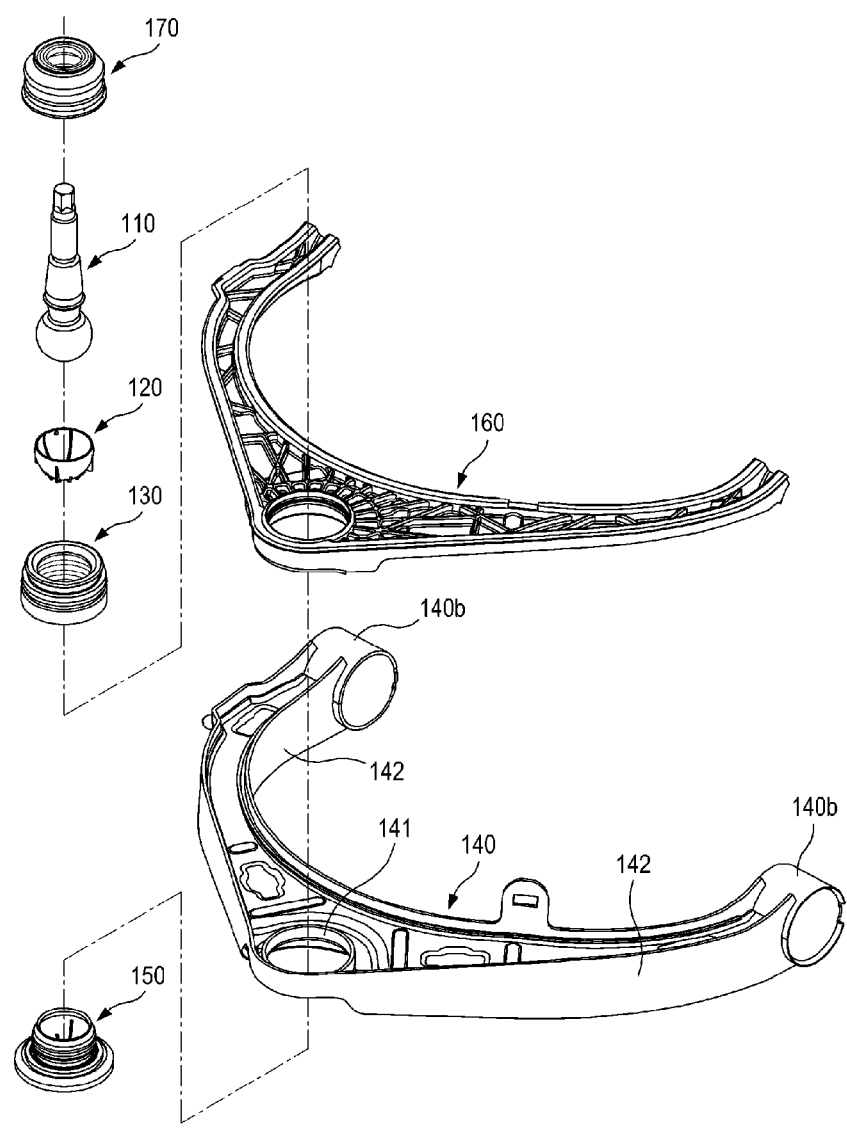
FIG. 4 is an exploded perspective view of the suspension arm shown in FIG. 2.

FIG. 4 is an exploded perspective view of the suspension arm shown in FIG. 2.

As shown in FIG. 4, the ball joint 100 comprises a ball stud 110, a bearing 120, a housing 130, and an insert molding part. In the following descriptions, the insert molding part provided in the ball joint 100 may be understood to a first insert molding part 150. The ball joint 100 is disposed at the portion opposite to the position where the bushing pipes 140b are disposed (that is, the portion where the two leg parts 140a meet each other).

The ball stud 110 includes a spherical ball 111 and a bar-shaped rod 112. The ball 111 is accommodated in the bearing 120 and is configured to rotate relative to the bearing 120. The rod 112 extends upwardly from an upper end of the ball 111 and is integrally formed with the ball 111. An upper end portion of the rod 112 is coupled to a knuckle of the vehicle. As the vehicle travels, the rod 112 is configured to be pivotable relative to the bearing 120 around the ball 111.

The bearing 120 is configured to accommodate at least a portion of the ball 111 of the ball stud 110. An inner peripheral surface 120a of the bearing 120 may be formed in a partial spherical shape so as to bring into contact with the ball 111 of the ball stud 110. For example, the central point of the inner peripheral surface 120a of the bearing 120 may be positioned to coincide with the central point of the ball 111 of the ball stud 110. The upper end of the bearing 120 may be formed lower than an upper end portion of the ball 111 of the ball stud 110. Thus, the ball 111 can be easily accommodated in the bearing 120. The upper end portion of the ball 111, which is not accommodated in the bearing 120, may be covered by the first insert molding part 150. The bearing 120 may be manufactured by injection-molding an acetal-based plastic material. For example, the acetal-based plastic material may be POM (Polyacetal, Polyoxymethylene) material. Accordingly, the bearing 120 can have excellent friction resistance and abrasion resistance, and thus can maintain initial performance even if it is used for a long time. The bearing 120 may also be defined as a ball seat on which the ball 111 of the ball stud 110 is seated.

Figure 5:
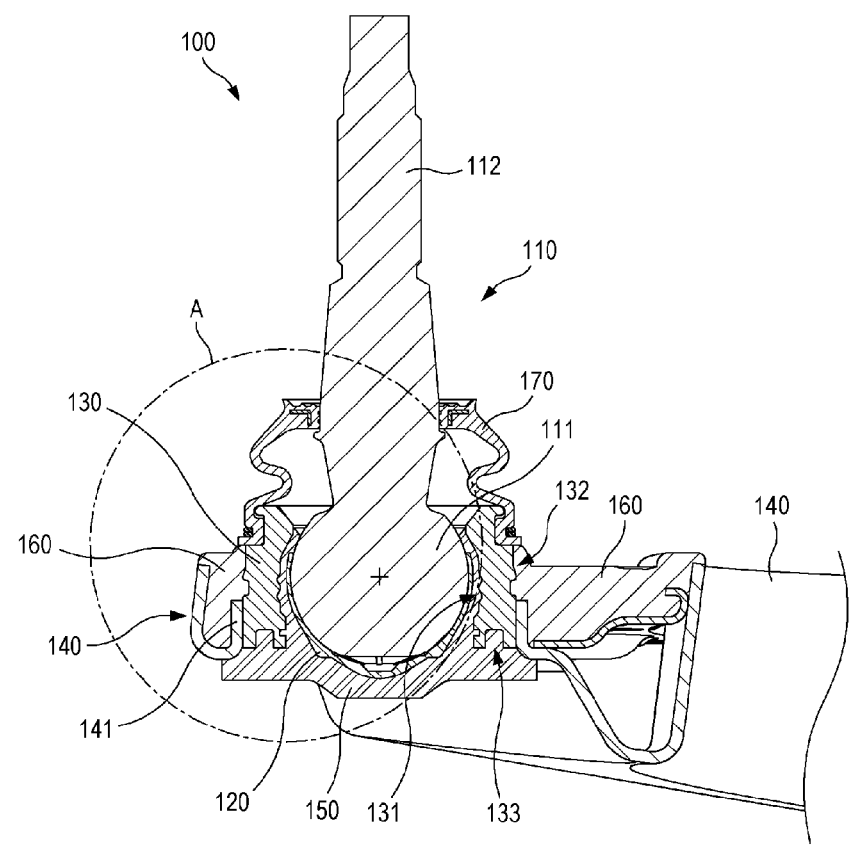
FIG. 5 is a cross-sectional view taken along line V-V in FIG. 2.

FIG. 5 is a cross-sectional view taken along line V-V in FIG. 2.

As shown in FIG. 5, the housing 130 has an inner peripheral portion 131, an outer peripheral portion 132, and a lower end portion 133. The ball 111 and the bearing 120 are disposed to be spaced apart from the inner peripheral portion 131 of the housing 130. The housing 130 has a hollow cylindrical shape. For example, the housing 130 may be manufactured by press-forming a pipe material, or may be manufactured by a forging process.

Figure 6:
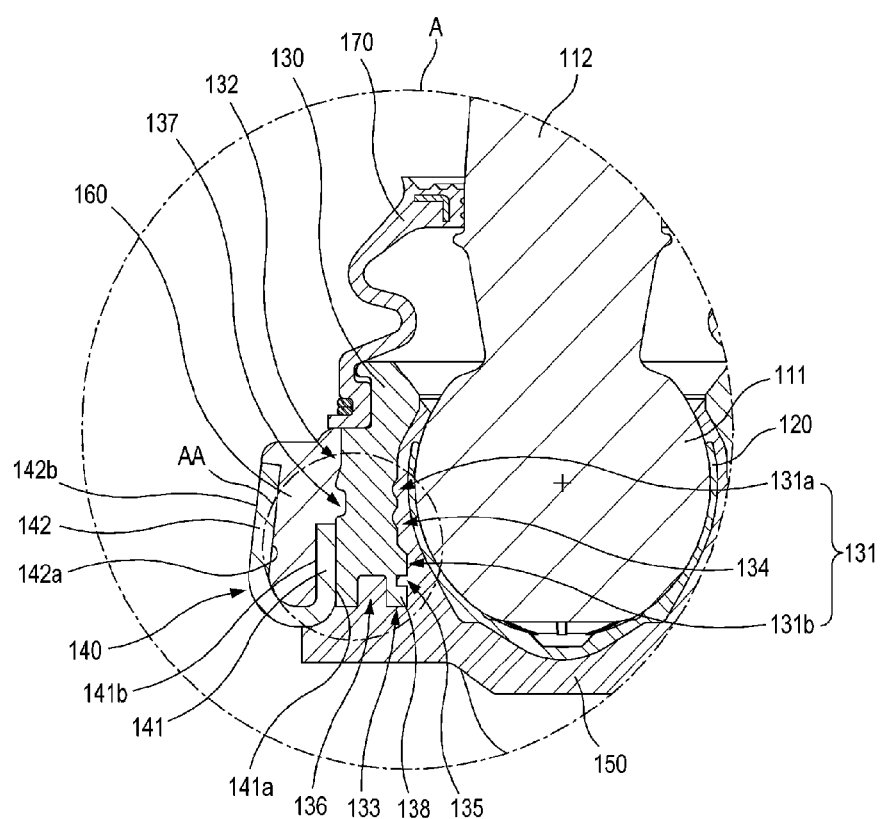
FIG. 6 is an enlarged partial view of portion A in FIG. 5.

FIG. 6 is an enlarged partial view of a portion A in FIG. 5.

As shown in FIG. 6, the inner peripheral portion 131 is disposed to be spaced apart from the ball 111 and an outer peripheral surface 120*b* of the bearing 120. Thus, a gap is formed between the inner peripheral portion 131 and the ball 111 and between the inner peripheral portion 131 and the bearing 120. The inner peripheral portion 131 comprises a first inner peripheral portion 131*a* and a second inner peripheral portion 131*b*. The first inner peripheral portion 131*a* has a partial spherical shape corresponding to the shape of the ball 111. The second inner peripheral portion 131*b* is positioned below the first inner peripheral portion 131*a* and has a linear shape parallel to the axial direction AD. A convex-concave portion 134 is formed on the inner peripheral portion 131 of the housing 130 along the circumferential direction CD. The convex-concave portion 134 may be formed along the circumferential direction CD in a continuous manner or in a discontinuous manner. For example, a plurality of convex-concave portions 134 may be formed on the first inner peripheral portion 131*a* so as to be spaced apart from each other in the axial direction AD. The concavo-convex portion 134 may be formed by performing a turning process on the first inner peripheral portion 131*a*.

A first groove 135 is formed on the inner peripheral portion 131 of the housing 130 below the convex-concave portion 134 along the circumferential direction CD. The first groove 135 may be formed along the circumferential direction CD in a continuous manner or in a discontinuous manner. For example, the first groove 135 may be formed to be concave in the radially outward direction OR from the second inner peripheral portion 131*b*.

The first groove 135 may be formed by performing a turning process on the second inner peripheral portion 131*b*. In the following descriptions, the first groove 135 is described as having a rectangular cross-sectional shape, but may have various cross-sectional shapes (for example, square, semi-circular, elliptical, triangular, trapezoidal and the like).

The outer peripheral portion 132 is formed to be spaced apart from the first inner peripheral portion 131*a* in the radially outward direction OR. The lower end portion 133 connects a lower end of the inner peripheral portion 131 (that is, the second inner peripheral portion 131*b*) to a lower end of the outer peripheral portion 132. The lower end portion 133 is disposed perpendicular to the second inner peripheral portion 131*b* and the outer peripheral portion 132. A second groove 136 is formed in the lower end portion 133 of the housing 130 along the circumferential direction CD. The second groove 136 may be formed along the circumferential direction CD in a continuous manner or in a discontinuous manner. For example, the second groove 136 may be formed to be concave upwardly from the lower end portion 133. The second groove 136 may be formed by performing a turning process on the lower end portion 133. In the following descriptions, the second groove 136 is described as having a rectangular cross-sectional shape, but may have various cross-sectional shapes (for example, square, semi-circular, elliptical, triangular, trapezoidal and the like).

The first insert molding part 150 is formed on the outer peripheral surface 120*b* of the bearing 120, the inner peripheral portion 131 of the housing 130, and the lower end portion 133 of the housing 130 to couple the bearing 120 with the housing 130. The first insert molding part 150 is formed by being injected from the lower side of the bearing 120 in a molten state and then being cured. The first insert molding part 150 is filled into a space between the inner peripheral portion 131 of the housing 130 and the ball 111 and a space between the inner peripheral portion 131 of the housing 130 and the bearing 120. The first insert molding part 150 is formed to surround the lower portion of the bearing 120 and the lower end portion 133 of the housing 130. In addition, the first insert molding part 150 may be formed to surround a portion of the lower end of the arm body 140.

Since the first insert molding part 150 is coupled to the inner peripheral portion 131 of the housing 130 in a shape that is engaged with the convex-concave portion 134 of the housing 130, the coupling force between the first insert molding part 150 and the inner peripheral portion 131 of the housing 130 can be increased. Thus, even if a large force is applied in a direction the ball stud 110 is away from the bearing 120 (that is, upward direction), the amount of deformation of the first insert molding part 150 in the axial direction AD and the amount of displacement of the ball stud 110 in the axial direction AD may be reduced. The first insert molding part 150 is also filled into the first groove 135 and the second groove 136. Since the first insert molding part 150 is filled into the first groove 135, the coupling force between the first insert molding part 150 and the housing 130 in the axial direction AD may be increased. Since the first insert molding part 150 is filled into the second groove 136, the coupling force between the first insert molding part 150 and the housing 130 in the radially outward direction OR or the radially inward direction IR may be increased.

Figure 7:
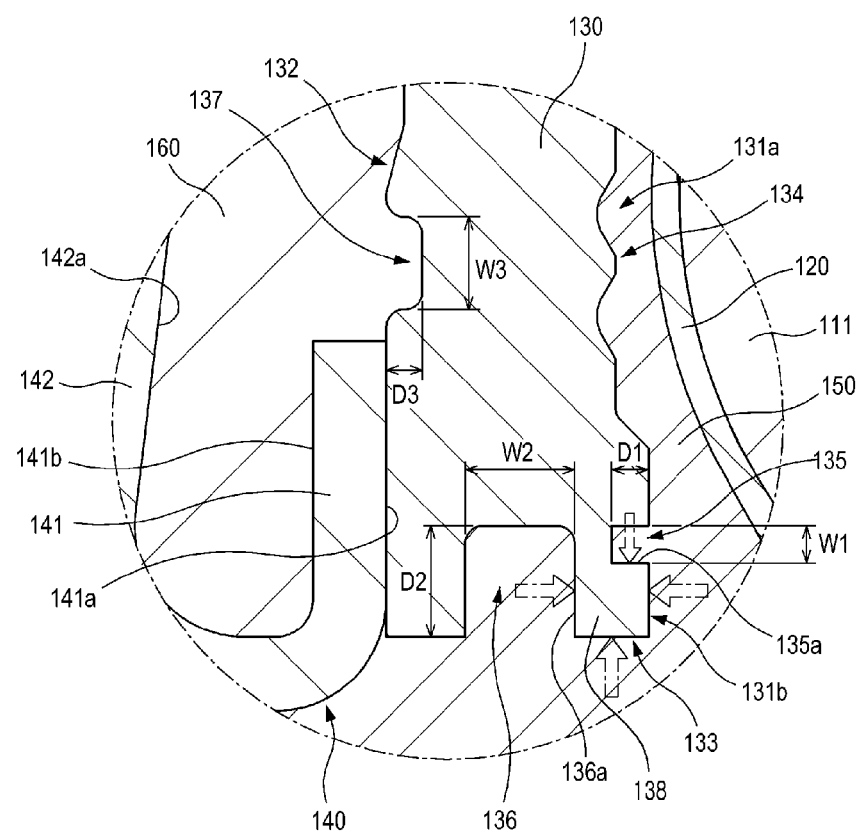
FIG. 7 is an enlarged partial view of portion AA in FIG. 6.

FIG. 7 is an enlarged partial view of a portion AA in FIG. 6.

As shown in FIG. 7, in one embodiment, the first groove 135 and the second groove 136 may be disposed to be spaced apart from each other. That is, the first groove 135 and the second groove 136 are disposed so as not to be overlapped with each other. When the first groove 135 and the second groove 136 are overlapped with each other, the first groove 135 and the second groove 136 may be in communication with each other. Thus, when the ball stud 110 exerts a strong force on the bearing 120, the first insert molding part 150 cannot be supported by the first groove 135. As a result, the coupling force between the housing 130 and the first insert molding part 150 may not be increased.

In one embodiment, a corner portion 138 may be formed at an edge portion where the inner peripheral portion 131 of the housing 130 and the lower end portion 133 of the housing 130 meet so as to be surrounded by the first groove 135 and the second groove 136. The first insert molding part 150 is filled into the first groove 135 and the second groove 136 in a molten state and then shrinks in a direction toward the center of the corner portion 138 (for example, in the direction of an arrow shown in FIG. 7) during the curing process. Accordingly, the first insert molding part 150 may press against a plurality of surfaces of the corner portion 138 (for example, the second inner peripheral portion 131*b*, the lower end portion 133, a lower end surface 135*a* of the first groove 135, and an inner wall surface 136*a* of the second groove 136) to strongly clamp the corner portion 138. As a result, the coupling force between the first insert molding part 150 and the housing 130 may be further increased.

In one embodiment, the first groove 135 may have a depth D1 of 1 mm to 3 mm in the radially outward direction OR from the inner peripheral portion 131 (that is, the second inner peripheral portion 131b) and a width W1 of 1 mm to 3 mm in the axial direction AD. If the depth D1 and/or the width W1 of the first groove 135 is less than 1 mm, the inner space of the first groove 135 becomes too narrow. This makes it difficult to form the first groove 135 in the housing 130. Further, the first insert molding part 150 may not be completely filled into the first groove 135, which generates an empty portion in the first groove 135. As a result, the coupling force between the first insert molding part 150 and the housing 130 may not be sufficiently secured. If the depth D1 and/or the width W1 of the first groove 135 exceeds 3 mm, the mechanical strength of the housing 130 may be decreased, and the first groove 135 may overlap the second groove 136. Therefore, the durability of the suspension arm 1 may be degraded.

In one embodiment, the second groove 136 may have a depth D2 of 1 mm to 3 mm upwardly from the lower end portion 133 and a width W2 of 1 mm to 3 mm in the radial direction. If the depth D2 and/or the width W2 of the second groove 136 is less than 1 mm, the inner space of the second groove 136 becomes too narrow. This makes it difficult to form the second groove 136 in the housing 130. Further, the first insert molding part 150 may not be filled into the second groove 136, which generates an empty portion in the second groove 136. As a result, the coupling force between the first insert molding part 150 and the housing 130 may not be sufficiently secured. If the depth D2 and/or the width W2 of the second groove 136 exceeds 3 mm, the mechanical strength of the housing 130 may be decreased, and the second groove 136 may overlap the first groove 135. In particular, if the depth D1 and the width W1 of the first groove 135 exceed 3 mm, and if the depth D2 and the width W2 of the second groove 136 exceed 3 mm, the mechanical strength of the corner portion 138 formed by the first groove 135 and the second groove 136 may be lowered. Thus, the corner portion 138 may be detached or separated from the housing 130. This may degrade the durability of the suspension arm 1.

In one embodiment, the suspension arm 1 may further comprise a second insert molding part 160 formed on a portion of the arm body 140 and the outer peripheral portion 132 of the housing 130 to couple the housing 130 with the arm body 140. The coupling force between the housing 130 and the arm body 140 can be increased by the second insert molding part 160.

In one embodiment, a third groove 137 may be formed on the outer peripheral portion 132 of the housing 130 above the arm body 140 along the circumferential direction CD. The third groove 137 may be formed along the circumferential direction CD in a continuous manner or in a discontinuous manner. For example, the third groove 137 may be formed to be concave in the radially inward direction IR from the outer peripheral portion 132. The third groove 137 may be formed by performing a turning process on the outer peripheral portion 132. In the following descriptions, the third groove 137 is described as having a rectangular cross-sectional shape, but may have various cross-sectional shapes (for example, square, semi-circular, elliptical, triangular, trapezoidal, and the like). The second insert molding part 160 is filled into the third groove 137. Therefore, the coupling force between the housing 130 and the second insert molding part 160 can be increased.

In one embodiment, the third groove 137 may have a depth D3 of 1 mm to 3 mm in the radially inward direction IR from the outer peripheral portion 132 of the housing 130 and a width W3 of 1 mm to 3 mm in the axial direction AD. If the depth D3 and/or the width W3 of the third groove 137 is less than 1 mm, the inner space of the third groove 137 becomes too narrow. This makes it difficult to form the third groove 137 in the housing 130. Further, the second insert molding part 160 may not be completely filled into the third groove 137, which generates an empty portion in the third groove 137. As a result, the coupling force between the second insert molding part 160 and the housing 130 may not be sufficiently secured. If the depth D3 and/or the width W3 of the third groove 137 exceeds 3 mm, the mechanical strength of the housing 130 may be lowered. This reduces the durability of the suspension arm 1.

In one embodiment, the first insert molding part 150 and the second insert molding part 160 may be made of a same plastic material (for example, a mixed material of polyamide and glass fiber). For example, the first insert molding part 150 and the second insert molding part 160 may be formed by simultaneously injecting a molding material supplied from a single raw material storage container through two nozzles arranged in different positions. This reduces the manufacturing cost and the manufacturing time of the first insert molding part 150 and the second insert molding part 160. In another embodiment, the first insert molding part 150 and the second insert molding part 160 may be made of different plastic materials in consideration of required mechanical strength, weight, or the like.

Figure 8:
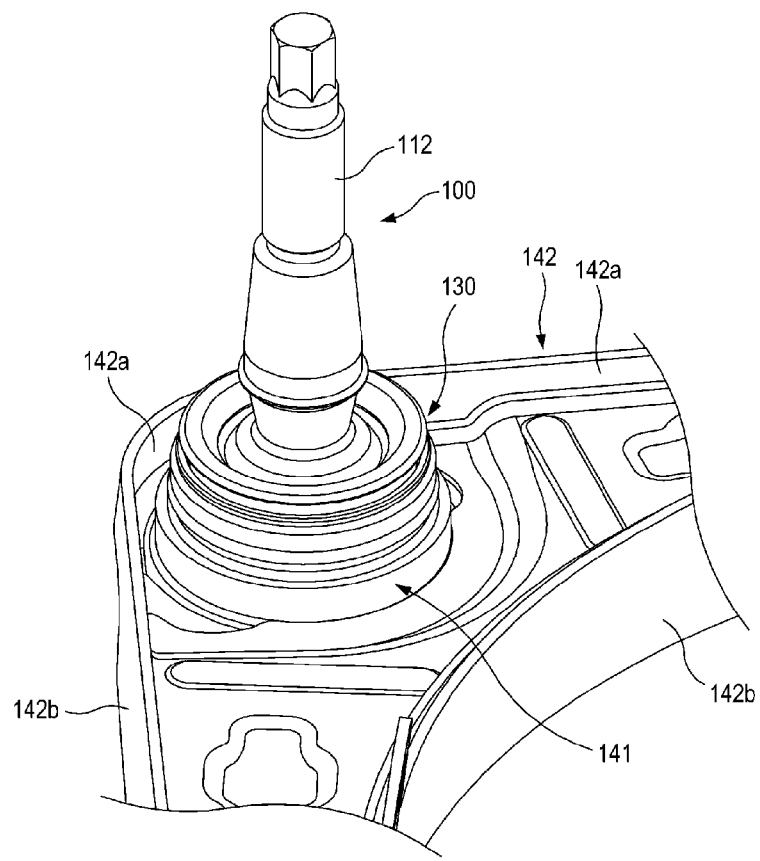
FIG. 8 is a partial perspective view showing a state in which a housing and an arm body shown in FIG. 4 are coupled to each other.

FIG. 8 is a partial perspective view showing a state in which the housing and the arm body shown in FIG. 4 are coupled to each other.

As shown in FIG. 8, in one embodiment, the arm body 140 may include a fitting portion 141 in which the outer peripheral portion 132 of the housing 130 is press-fitted. The fitting portion 141 may be formed to have a hollow cylindrical shape from the arm body 140 by a burring process. Accordingly, the contact area between the outer peripheral portion 132 of the housing 130 and the fitting portion 141 of the arm body 140 is widened, which makes it possible to increase the coupling force between the housing 130 and the arm body 140 and to secure a wide contact area for welding (to be described later). As the outer peripheral portion 132 of the housing 130 is press-fitted in the fitting portion 141, the housing 130 may be fixed to the arm body 140. The arm body 140 may further comprise a sidewall portion 142 disposed to be spaced apart from the fitting portion 141 in the radially outward direction OR. The sidewall portion 142 may comprise an inner sidewall 142a on which the second insert molding part 160 is formed, and an outer sidewall 142b located outside the inner sidewall 142a. The outer sidewall 142b may be exposed to the outside and may be surrounded by the second insert molding part 160 according to specifications required for manufacturing the vehicle.

Figure 9:
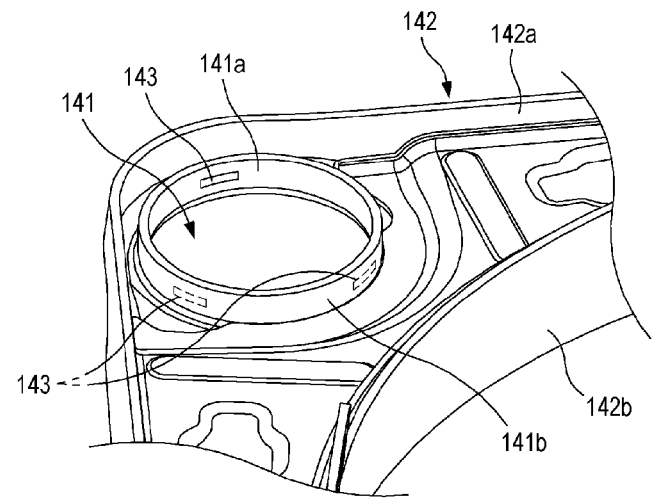
FIG. 9 is a partial perspective view showing a state in which the arm body shown in FIG. 8 is separated from the ball joint.
Figure 9:
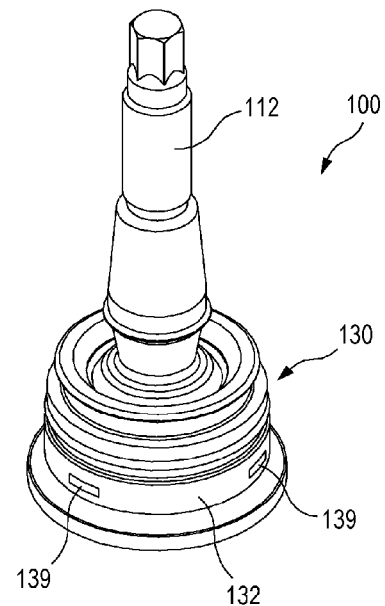

FIG. 9 is a partial perspective view showing a state in which the arm body shown in FIG. 8 is separated from the ball joint.

As shown in FIG. 9, in one embodiment, the arm body 140 may be coupled to the housing 130 by welding in a state in which the outer peripheral portion 132 of the housing 130 is press-fitted in the fitting portion 141. For example, the outer peripheral portion 132 of the housing 130 is press-fitted in the inner peripheral surface 141a of the fitting portion 141 such that they are brought into contact with each other, and welding is performed between the outer peripheral portion 132 of the housing 130 and the inner peripheral surface 141a of the fitting portion 141. In one embodiment, the housing 130 may comprise a plurality of first welding portions 139 arranged to be spaced apart from one another on the outer peripheral portion 132 along the circumferential direction CD. The arm body 140 may comprise a plurality of second welding portions 143 arranged to be spaced apart from one another on the fitting portion 141 along the circumferential direction CD. Since both the arm body 140 and the housing 130 are made of a steel material, any method may be used as long as it welds between steel materials, and the welding is not limited to any specific welding method. For example, the housing 130 and the arm body 140 may be coupled to each other by an arc welding between the first welding portion 139 and the second welding portion 143. The first welding portions 139 and the second welding portions 143 may be arranged at regular intervals along the circumferential direction CD. For example, three first welding portions 139 and three second welding portions 143 may be arranged at intervals of 120 degrees along the circumferential direction CD. Further, each of the first welding portion 139 and the second welding portion 143 may have a length of about 10 mm to 15 mm along the circumferential direction CD. The coupling force between the housing 130 and the arm body 140 may be further enhanced by the welding. In consideration of the coupling force between the housing 130 and the arm body 140 and/or the manufacturing cost of the suspension arm 1, the number of first welding portions 139 and the number of second welding portions 143 may be appropriately selected.

Figure 10:
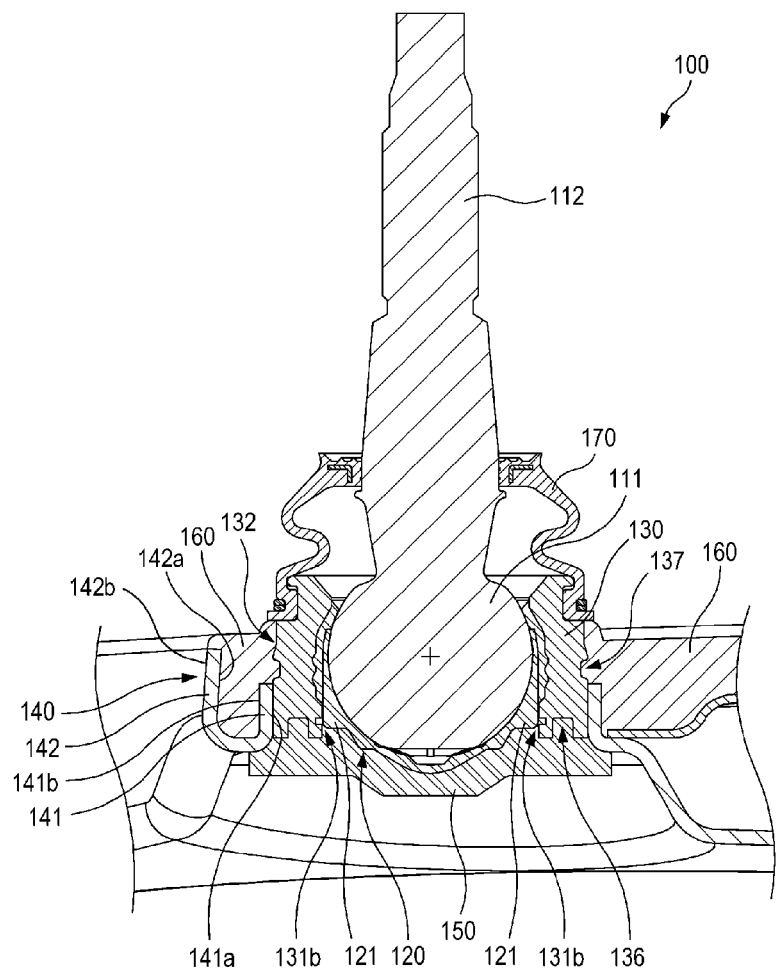
FIG. 10 is a cross-sectional view taken along line X-X in FIG. 2.

FIG. 10 is a cross-sectional view taken along line X-X in FIG. 2.

As shown in FIG. 10, in one embodiment, the second insert molding part 160 may be formed on the outer peripheral portion 132 of the housing 130 and the fitting portion 141 of the arm body 140 to couple the housing 130 with the arm body 140. The inner peripheral surface 141a of the fitting portion 141 is in contact with the outer peripheral portion 132 of the housing 130, and the second insert molding part 160 is formed on the outer peripheral surface 141b of the fitting portion 141. Since the second insert molding part 160 is formed on a portion of the housing 130 and a portion of the arm body 140, the coupling force between the housing 130 and the arm body 140 can be further enhanced.

Figure 11:
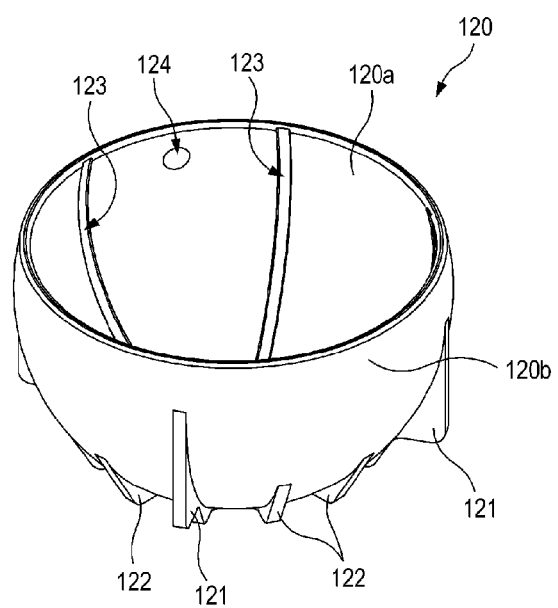
FIG. 11 is a perspective view of a bearing shown in FIG. 4.

FIG. 11 is a perspective view of the bearing 120 shown in FIG. 4.

In one embodiment, a plurality of first guide ribs 121 may be formed on the outer peripheral surface 120b of the bearing 120. The first guide ribs 121 has a plate shape and are arranged to be in contact with the second inner peripheral portion 131b of the housing 130. As shown in FIG. 11, the plurality of first guide ribs 121 protrude from the outer peripheral surface 120b of the bearing 120 and are arranged at regular intervals on the outer peripheral surface 120b along the circumferential direction CD. Accordingly, the first guide ribs 121 prevent the bearing 120 from moving or rotating relative to the housing 130 during the injection molding of the first insert molding part 150.

As shown in FIG. 11, in one embodiment, a plurality of second guide ribs 122 may be formed on the outer peripheral surface 120b of the bearing 120. The plurality of second guide ribs 122 are arranged at regular intervals on the outer peripheral surface 120b along the circumferential direction CD while being disposed between adjacent first guide ribs 121. The plurality of second guide ribs 122 form a flow path so that the first insert molding part 150 of a molten state is evenly distributed on the outer peripheral surface 120b of the bearing 120 during the injection molding of the first insert molding part 150. Thus, even if a molten material is injected toward the lower portion of the bearing 120 at high pressure during the injection molding of the first insert molding part 150, a constant injection pressure may be applied to the outer peripheral surface 120b of the bearing 120. As a result, it is possible to prevent the bearing 120 from moving or rotating relative to the housing 130 during the injection molding the first insert molding part.

In one embodiment, a plurality of first grooves 123 may be formed in the inner peripheral surface 120a of the bearing 120. The first grooves 123 may be formed to extend in the axial direction AD along the inner peripheral surface 120a of the bearing 120, and may have a narrow width along the circumferential direction CD and a long length along the inner peripheral surface 120a. The plurality of first grooves 123 may be arranged to be spaced apart from each other at regular intervals along the circumferential direction CD. In one embodiment, a plurality of second grooves 124 may be formed in the inner peripheral surface 120a of the bearing 120. The second grooves 124 may have a circular shape. The second grooves 124 may be arranged to be spaced apart from each other at regular intervals along the circumferential direction CD. Lubricant (for example, grease) is injected into the plurality of first grooves 123 and the plurality of second grooves 124 so that the ball 111 can be smoothly rotated within the bearing 120.

Figure 12:
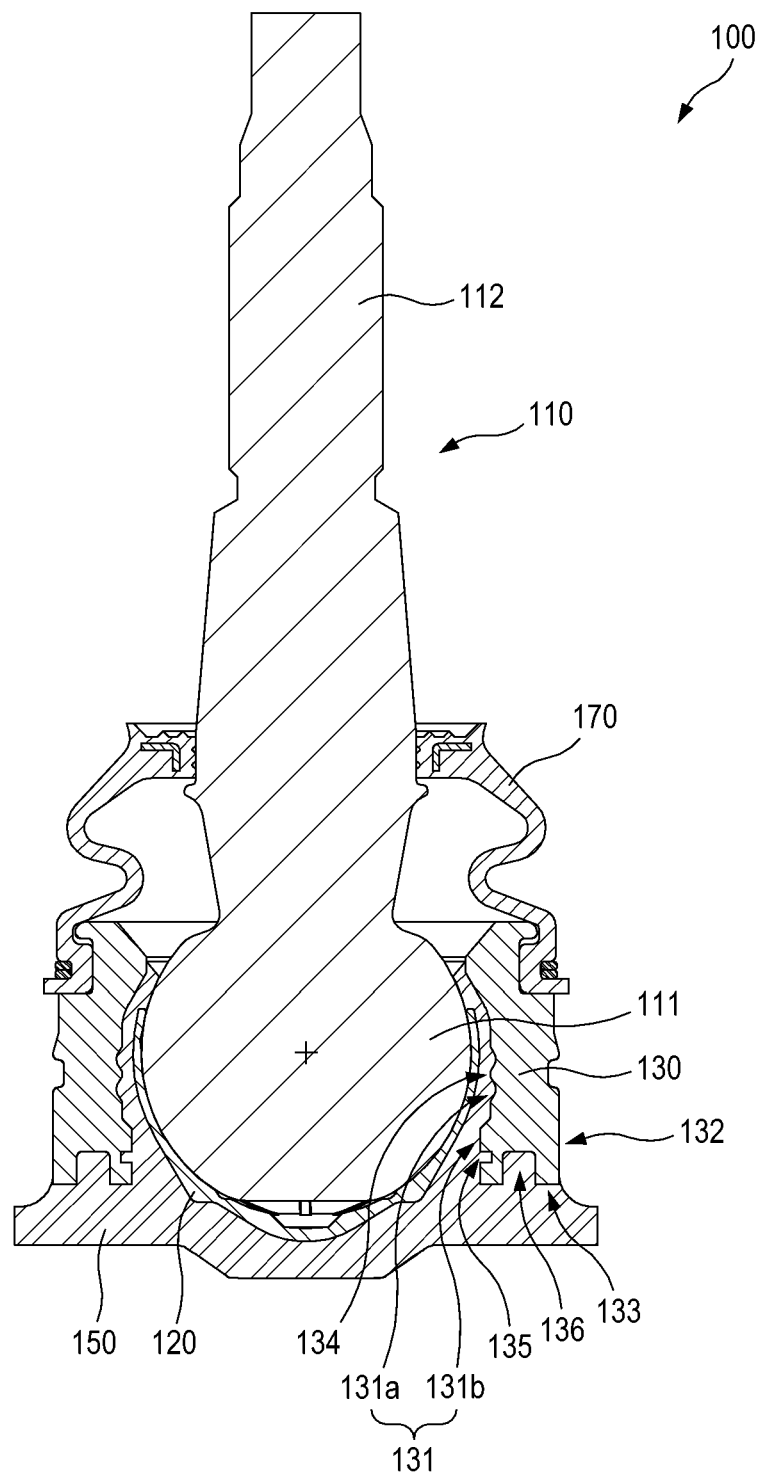
FIG. 12 is a perspective view showing a ball joint according to another embodiment of the present disclosure.

FIG. 12 is a cross-sectional view illustrating a ball joint according to another embodiment of the present disclosure.

Referring to FIG. 12, a ball joint 100 according to another embodiment of the present disclosure comprises a ball stud 110, a bearing 120, a housing 130, and an insert molding part. The ball stud 110, the bearing 120, and the housing 130 according to the embodiment shown in FIG. 12 may be configured to be identical to or similar to the ball stud 110, the bearing 120, and the housing 130 of the suspension arm 1 according to the embodiment shown in FIGS. 2 to 11. The insert molding part according to the embodiment shown in FIG. 12 may be configured to be identical to or similar to the first insert molding part 150 of the suspension arm 1 according to the embodiment shown in FIGS. 2 to 11. That is, the ball joint 100 according to the embodiment shown in FIG. 12 may be included in the suspension arm 1 according to the embodiment shown in FIGS. 2 to 11. Therefore, a detailed description of the ball joint 100 will be omitted.

In one embodiment, the ball joint 100 may be manufactured as a single part and may be assembled to various suspension arms. For example, the ball joint 100 manufactured as a single part may be coupled to the suspension arm by press-fitting and/or welding. In addition, after the ball joint 100 is press-fitted in and/or welded to the suspension arm, the housing 130 of the ball joint 100 and the suspension arm may be coupled to each other by the insert molding part.

In one embodiment, the ball joint 100 may further comprise a dust cover 170. The dust cover 170 has an upper end mounted on the rod 112 of the ball stud 110 and a lower end coupled to the outer peripheral portion 132 of the housing 130. The dust cover 170 prevents foreign substances such as water or dust from being introduced into the bearing 120 or the housing 130.

While the present disclosure has been described in terms of some embodiments and the examples shown in the accompanying drawings, it will be understood by those skilled in the art that various substitutions, modifications, and changes may be made without departing from the spirit and scope of the disclosure as will be understood by those skilled in the art. It is also intended that such substitutions, modifications, and alterations be included within the scope of the appended claims.

What is claimed is:

1. A suspension arm comprising:
a ball stud including a spherical ball;
a bearing in which the ball is accommodated;
a housing having an inner peripheral portion, an outer peripheral portion, and a lower end portion that connects a lower end of the inner peripheral portion and a lower end of the outer peripheral portion, and configured to accommodate the ball and the bearing in a state in which the ball and the bearing are spaced apart from the inner peripheral portion;
an arm body coupled to a portion of the outer peripheral portion of the housing; and
a first insert molding part formed on an outer peripheral portion of the bearing, the inner peripheral portion of the housing, and the lower end portion of the housing to couple the bearing with the housing,
wherein a convex-concave portion is formed on the inner peripheral portion of the housing along a circumferential direction, a first groove is formed on a lower side of the convex-concave portion along the circumferential direction, a second groove is formed on the lower end portion of the housing along the circumferential direction, and the first groove and the second groove are filled with the first insert molding part, and
wherein the first groove has a depth of 1 mm to 3 mm in a radially outward direction from the inner peripheral portion and a width of 1 mm to 3 mm in an axial direction.

2. The suspension arm of claim 1, wherein the first groove and the second groove are disposed to be spaced apart from each other.

3. The suspension arm of claim 1, wherein a corner portion is formed at an edge portion where the inner peripheral portion of the housing and the lower end portion of the housing meet to be surrounded by the first groove and the second groove.

4. The suspension arm of claim 1, wherein the second groove has a depth of 1 mm to 3 mm upward from the lower end portion and a width of 1 mm to 3 mm in a radial direction.

5. The suspension arm of claim 1, further comprising: a second insert molding part formed on a portion of the arm body and the outer peripheral portion of the housing to couple the housing with the arm body.

6. The suspension arm of claim 5, wherein a third groove is formed on the outer peripheral portion of the housing above the arm body along the circumferential direction, and the third groove is filled with the second insert molding part.

7. The suspension arm of claim 6, wherein the third groove has a depth of 1 mm to 3 mm in the radially inward direction from the outer peripheral portion of the housing and a width of 1 mm to 3 mm in the axial direction.

8. The suspension arm of claim 5, wherein the first insert molding part and the second insert molding part are made of a same plastic material.

9. The suspension arm of claim 8, wherein the first insert molding part and the second insert molding part are made of a mixed material of a polyamide and a glass fiber.

10. The suspension arm of claim 1, wherein the arm body comprises a fitting portion in which the outer peripheral portion of the housing is press-fitted.

11. The suspension arm of claim 10, wherein the arm body is coupled to the housing by a welding in a state in which the outer peripheral portion of the housing is press-fitted in the fitting portion.

12. The suspension arm of claim 11, wherein the arm body is coupled to the housing by the welding in a state in which the outer peripheral portion of the housing is brought into contact with an inner peripheral surface of the fitting portion.

13. The suspension arm of claim 10, further comprising: a second insert molding part formed on the outer peripheral portion of the housing and the fitting portion of the arm body to couple the housing with the arm body.

14. A ball joint comprising:
a ball stud including a spherical ball;
a bearing in which the ball is accommodated;
a housing having an inner peripheral portion, an outer peripheral portion, and a lower end portion that connects a lower end of the inner peripheral portion and a lower end of the outer peripheral portion, and configured to accommodate the ball and the bearing in a state in which the ball and the bearing are spaced apart from the inner peripheral portion; and
an insert molding part formed on an outer peripheral portion of the bearing, the inner peripheral portion of the housing, and the lower end portion of the housing to couple the bearing with the housing,
wherein a convex-concave portion is formed on the inner peripheral portion of the housing along a circumferential direction, a first groove is formed on a lower side of the convex-concave portion along the circumferential direction, a second groove is formed on the lower end portion of the housing along the circumferential direction, and the first groove and the second groove are filled with the insert molding part, and
wherein the first groove has a depth of 1 mm to 3 mm in a radially outward direction from the inner peripheral portion and a width of 1 mm to 3 mm in an axial direction.

15. The ball joint of claim 14, wherein the first groove and the second groove are disposed to be spaced apart from each other.

16. The ball joint of claim 14, wherein a corner portion is formed at an edge portion where the inner peripheral portion of the housing and the lower end portion of the housing meet so as to be surrounded by the first groove and the second groove.

17. The ball joint of claim 14, wherein the second groove has a depth of 1 mm to 3 mm upward from the lower end portion and a width of 1 mm to 3 mm in a radial direction.

* * * * *